United States Patent
Nitawaki et al.

(10) Patent No.: US 8,936,126 B2
(45) Date of Patent: Jan. 20, 2015

(54) VEHICLE MOUNTING STRUCTURE FOR BATTERY PACK

(71) Applicant: Suzuki Motor Corporation, Shizuoka (JP)

(72) Inventors: Kunihiro Nitawaki, Shizuoka (JP); Atsushi Horiuchi, Shizuoka (JP)

(73) Assignee: Suzuki Motor Corporation, Shizuoka (JP)

(*) Notice: Subject to any disclaimer, the term of this patent is extended or adjusted under 35 U.S.C. 154(b) by 53 days.

(21) Appl. No.: 13/895,473

(22) Filed: May 16, 2013

(65) Prior Publication Data

US 2013/0327583 A1 Dec. 12, 2013

(30) Foreign Application Priority Data

Jun. 8, 2012 (JP) ................................. 2012-130752

(51) Int. Cl.
*B60K 1/04* (2006.01)
(52) U.S. Cl.
USPC ........................................ 180/68.5; 429/100
(58) Field of Classification Search
USPC ................ 180/68.5, 65.1, 89.11, 69.1, 65.22;
296/487.03, 187.05, 187.08, 187.11,
296/193.07, 193.08, 203.04; 429/96, 99,
429/100
See application file for complete search history.

(56) References Cited

U.S. PATENT DOCUMENTS

| | | | | |
|---|---|---|---|---|
| 3,773,346 A * | 11/1973 | Scheublein et al. | ... | 280/124.101 |
| 5,305,513 A * | 4/1994 | Lucid et al. | ................ | 29/402.08 |
| 5,555,950 A * | 9/1996 | Harada et al. | ................ | 180/65.1 |
| 5,585,205 A * | 12/1996 | Kohchi | ........................... | 429/99 |
| 6,111,760 A * | 8/2000 | Nixon | ........................... | 361/814 |
| 6,662,891 B2 * | 12/2003 | Misu et al. | ................... | 180/68.1 |
| 6,983,945 B2 * | 1/2006 | Kawasaki et al. | ............ | 280/834 |
| 7,025,160 B2 * | 4/2006 | Awakawa | ..................... | 180/68.5 |
| 7,051,825 B2 * | 5/2006 | Masui et al. | ................. | 180/68.5 |
| 7,396,075 B2 * | 7/2008 | Ohkuma et al. | ........... | 297/180.1 |
| 7,614,473 B2 * | 11/2009 | Ono et al. | ..................... | 180/299 |
| 7,654,351 B2 * | 2/2010 | Koike et al. | ................. | 180/68.5 |
| 7,688,582 B2 * | 3/2010 | Fukazu et al. | ............... | 361/690 |
| 7,836,999 B2 * | 11/2010 | Kato | ............................. | 180/312 |
| 7,905,307 B2 * | 3/2011 | Kubota et al. | ................ | 180/68.1 |
| 8,037,960 B2 * | 10/2011 | Kiya | ............................. | 180/68.5 |
| 8,118,125 B2 * | 2/2012 | Suzuki et al. | ................ | 180/68.5 |
| 8,372,530 B2 * | 2/2013 | Kubota et al. | ................ | 429/100 |
| 8,393,426 B2 * | 3/2013 | Takahashi et al. | .......... | 180/68.5 |
| 8,413,751 B2 * | 4/2013 | Jufuku et al. | ................ | 180/68.5 |

(Continued)

FOREIGN PATENT DOCUMENTS

JP  2010-89567 A  4/2010

*Primary Examiner* — Katy M Ebner
*Assistant Examiner* — Brodie Follman
(74) *Attorney, Agent, or Firm* — Rothwell, Figg, Ernst & Manbeck, P.C.

(57) ABSTRACT

A vehicle battery pack mounting structure that suppresses vibrations of a floor panel while making a shock absorbing space between the battery pack and vehicle exterior members large by effectively utilizing a space between coil springs. The battery pack mounting structure includes a pair of left and right side members and a cross member for supporting the battery pack. A pair of left and right coil springs is installed at these side members and function as suspension members. The battery pack is installed inside an opening of a floor panel between the coil springs, and also between the coil springs, a front portion of the battery pack has a tapered outer surface that becomes narrower as it enters deeper into a space between the coil springs. The opening of the floor panel also has a tapered edge shape.

5 Claims, 4 Drawing Sheets

(56) References Cited

U.S. PATENT DOCUMENTS

| | | | |
|---|---|---|---|
| 8,453,778 B2 * | 6/2013 | Bannier et al. | 180/68.5 |
| 8,505,662 B2 * | 8/2013 | Schwarz et al. | 180/68.5 |
| 2001/0030069 A1 * | 10/2001 | Misu et al. | 180/68.1 |
| 2002/0187382 A1 * | 12/2002 | Nishiumi et al. | 429/34 |
| 2003/0189334 A1 * | 10/2003 | Kawasaki et al. | 280/834 |
| 2004/0079569 A1 * | 4/2004 | Awakawa | 180/68.5 |
| 2004/0235315 A1 * | 11/2004 | Masui et al. | 439/34 |
| 2005/0285563 A1 * | 12/2005 | Yoneda | 320/112 |
| 2007/0040418 A1 * | 2/2007 | Ohkuma et al. | 297/15 |
| 2008/0062622 A1 * | 3/2008 | Fukazu et al. | 361/678 |
| 2008/0093140 A1 * | 4/2008 | Asai et al. | 180/65.4 |
| 2008/0251246 A1 * | 10/2008 | Ohkuma et al. | 165/287 |
| 2009/0025989 A1 * | 1/2009 | Takaku et al. | 180/65.1 |
| 2009/0090575 A1 * | 4/2009 | Nagasaka | 180/68.5 |
| 2009/0205891 A1 * | 8/2009 | Parrett et al. | 180/68.1 |
| 2010/0059208 A1 * | 3/2010 | Nakamura | 165/104.34 |
| 2010/0112412 A1 * | 5/2010 | Aoto | 429/34 |
| 2010/0112424 A1 * | 5/2010 | Hayashi | 429/99 |
| 2010/0170736 A1 * | 7/2010 | Watanabe et al. | 180/68.5 |
| 2010/0213741 A1 * | 8/2010 | Suzuki et al. | 296/193.07 |
| 2010/0273040 A1 * | 10/2010 | Kubota et al. | 429/100 |
| 2010/0276220 A1 * | 11/2010 | Kubota et al. | 180/68.1 |
| 2010/0294580 A1 * | 11/2010 | Kubota et al. | 180/68.1 |
| 2011/0000729 A1 * | 1/2011 | Schwarz et al. | 180/68.5 |
| 2011/0011654 A1 * | 1/2011 | Kubota et al. | 180/65.21 |
| 2011/0068606 A1 * | 3/2011 | Klimek et al. | 296/187.08 |
| 2011/0123309 A1 * | 5/2011 | Berdelle-Hilge et al. | 414/800 |
| 2011/0139527 A1 * | 6/2011 | Bannier et al. | 180/68.5 |
| 2011/0262801 A1 * | 10/2011 | Schwab | 429/163 |
| 2011/0284299 A1 * | 11/2011 | Takahashi et al. | 180/65.21 |
| 2011/0288708 A1 * | 11/2011 | Katono et al. | 701/22 |
| 2011/0315464 A1 * | 12/2011 | Yokoyama et al. | 180/68.5 |
| 2012/0055722 A1 * | 3/2012 | Matsuzawa et al. | 180/65.21 |
| 2012/0080250 A1 * | 4/2012 | Ohashi | 180/65.31 |
| 2012/0090907 A1 * | 4/2012 | Storc et al. | 180/68.5 |
| 2012/0111528 A1 * | 5/2012 | Takeuchi et al. | 165/41 |
| 2012/0115000 A1 * | 5/2012 | Hashimura et al. | 429/100 |
| 2012/0160584 A1 * | 6/2012 | Nitawaki | 180/68.5 |
| 2012/0175177 A1 * | 7/2012 | Lee et al. | 180/68.5 |
| 2012/0175899 A1 * | 7/2012 | Gadhiya et al. | 293/132 |
| 2012/0199406 A1 * | 8/2012 | Bender et al. | 180/68.5 |
| 2012/0208053 A1 * | 8/2012 | Bender et al. | 429/88 |
| 2012/0208057 A1 * | 8/2012 | Bender et al. | 429/99 |
| 2013/0020139 A1 * | 1/2013 | Kim et al. | 180/68.5 |
| 2013/0045398 A1 * | 2/2013 | Katano et al. | 429/7 |
| 2013/0119704 A1 * | 5/2013 | Amano et al. | 296/187.1 |
| 2013/0146373 A1 * | 6/2013 | Kosaki et al. | 180/65.1 |
| 2013/0161105 A1 * | 6/2013 | Maguire et al. | 180/68.5 |
| 2013/0175104 A1 * | 7/2013 | Murray | 180/65.1 |
| 2013/0248267 A1 * | 9/2013 | Nitawaki | 180/68.5 |

* cited by examiner

VEHICLE MOUNTING STRUCTURE FOR BATTERY PACK

CROSS-REFERENCE TO RELATED APPLICATION

The present application claims the benefit of priority under 35 U.S.C. §119 to Japanese Patent Application No. 2012-130752, filed on Jun. 8, 2012, the entire content of which is incorporated herein by reference.

FIELD OF THE INVENTION

The present invention relates to a vehicle mounting structure for a battery pack, and more specifically, relates to one that reduces damage of the battery pack at a time of a crash of the vehicle while suppressing increase of vibrations due to a structure for mounting the battery pack.

BACKGROUND OF THE INVENTION

The electric vehicles and hybrid vehicles that mount an electric motor as a driving source require mounting on a vehicle a battery pack that accommodates batteries capable of storing large capacity electric powers, because electric powers are to be supplied to vehicle mounted electric parts in addition to the electric motor.

This type of battery pack includes one that adopts a form of being accommodated inside a concave recess formed on a floor panel (see, for example, Japanese Patent Application Publication No. 2010-89567).

In such a vehicle mounting structure for a battery pack, a form of being installed in a luggage room on a rear portion side of the vehicle (there are cases where it is on a front portion side depending on a structure of the vehicle) is frequently used, in order to secure as much space as possible in the vehicle interior for passengers.

Also, in recent years, the vehicle is devised to make deformation of its exterior members functioning as cushions, by securing a large shock absorbing space for a time of a crash between the exterior members and the internal parts. In particular, it is advantageous for a space inside the luggage room to be secured large as a measure against a crash from a rear side.

Then, it is common to install a pair of left and right coil springs on front and rear of the vehicle. For this reason, there is a need to install the battery pack in such a way that the pair of left and right coil springs is avoided, so that there is a limitation on the installation position. For example, in the case of installing the battery pack between the coil springs, there is a need to make a width of the exterior casing smaller than the separation interval of the coil springs.

For this reason, in the case of the large capacity battery pack, if it is installed on a rear side of the coil springs it would come in close proximity to the exterior members such as a hatchback door of the vehicle, whereas if it is installed between the coil springs it would become long in the front and rear direction and as a result it would come in close proximity to the exterior members of the vehicle. In short, in the case of the large capacity battery pack, a large shock absorbing space for a time of a crash between the battery pack and the exterior members of the vehicle cannot be secured.

By the way, for this vehicle mounting structure for a battery pack, there is a case of adopting a form in which the battery pack is accommodated by forming an opening on the floor panel, so that a space of the luggage room will not be occupied as much as possible. In this case, there are occasions in which places with a narrow width and a low rigidity will be created outside that opening of the floor panel and the inconvenience of having vibrations of the floor panel increased due to vibrations from the vehicle body side such as the coil springs arises.

Note that, in one that is described in Japanese Patent Application Publication No. 2010-89567, it is substantially a form of recessing the floor panel so that it is difficult to recess it largely and as a result it would occupy a large space inside the luggage room.

SUMMARY OF THE INVENTION

For this reason, the present invention has an object of providing a vehicle mounting structure for a battery pack, capable of securing a shock absorbing space between the battery pack and the vehicle exterior members as large as possible while preventing the floor panel from vibrating as much as possible, by effectively utilizing a space between the coil springs.

The first aspect of the invention according to a vehicle mounting structure for a battery pack that solves the above noted problems is a vehicle mounting structure for a battery pack in which batteries for supplying electric powers to electric instruments mounted on a vehicle are accommodated, characterized in that said vehicle comprises framework members for directly or indirectly supporting said battery pack, a pair of left and right coil springs functioning as suspensions by being directly or indirectly linked with said framework members, and a floor panel to be a floor surface of a vehicle interior by being directly or indirectly supported by said framework members, said battery pack is installed inside an opening opened up at said floor panel, and a front portion side or a rear portion side in a front and rear direction of said vehicle is located between said coil springs, and an opening shape of said opening and an outer shape of said battery pack that coincide with an extended plane of said floor panel between said coil springs are formed to be a tapered shape that becomes narrower as it enters deeper into a space between said coil springs.

The second aspect of the invention according to a vehicle mounting structure for a battery pack that solves the above noted problems is, in addition to the specifying matters of the first aspect described above, one that is characterized in that said tapered shape of the opening shape of said opening of said floor panel and the outer shape of said battery pack is formed such that a shortest location between said tapered shape and each of said coil springs is located at a middle portion of an edge of said tapered shape.

The third aspect of the invention according to a vehicle mounting structure for a battery pack that solves the above noted problems is, in addition to the specifying matters of the first aspect described above, one that is characterized in that said tapered shape of the opening shape of said opening of said floor panel and the outer shape of said battery pack is formed by inclined edges that are to be arranged at facing positions with respect to said coil springs at an opening edge of said opening of said floor panel and an outer surface of said battery pack, which is smoothly continuous with both a side face side and a front face side of the opening shape of said opening of said floor panel and the outer shape of said battery pack.

The fourth aspect of the invention according to a vehicle mounting structure for a battery pack that solves the above noted problems is, in addition to the specifying matters of the first aspect described above, one that is further comprising sub-frames formed in frame shapes along an opening edge of said opening of said floor panel and supported by said framework members, characterized in that said battery pack is supported by said framework members via said sub-frames, and said floor panel has a vicinity of at least a corner portion at the opening edge of said opening fixed to said sub-frames.

The fifth aspect of the invention according to a vehicle mounting structure for a battery pack that solves the above noted problems is, in addition to the specifying matters of the first aspect described above, one that is characterized in that said opening of said floor panel is formed at an offset position near one side in a width direction of said vehicle, and supported with the opening edge of said opening positioned at an upper side of one of said framework members.

The sixth aspect of the invention according to a vehicle mounting structure for a battery pack that solves the above noted problems is, in addition to the specifying matters of the first aspect described above, one that is characterized in that said battery pack is installed inside said opening of said floor panel that becomes a floor surface inside a luggage room on a rear side of said vehicle.

As such, according to one aspect of the present invention, by forming the outer shape of the battery pack and the opening shape of the opening of the floor panel at locations in close proximity to the coil springs into the tapered shape, it is possible to secure a space between the battery pack and the coil springs while positioning the battery pack from a tip end side of that tapered shape and between the coil springs. Therefore, the battery pack can be positioned between the coil springs by effectively utilizing a space between the coil springs, and it is possible to secure a separation distance from exterior members of the vehicle while realizing a large capacity. Also, the floor panel can form a space between an edge of the opening and the coil springs as wide as possible, so that it can prevent propagating vibrations. As a result of this, a shock absorbing space between the battery pack and the exterior members of the vehicle can be made as large as possible, and it is possible to suppress vibrations of the floor panel.

Also, by fixing the opening of the floor panel and the battery pack, especially a vicinity of a corner portion forming the tapered shape, by utilizing frame like sub-frames, it is possible to suppress vibrations more surely. Moreover, in the case where there is a need to offset an installation position of the battery pack to either one of left and right, it is possible to fix the battery pack at a higher strength and it is possible to suppress vibrations more surely, by utilizing the strength of the framework members.

DETAILED DESCRIPTION OF THE INVENTION

In the following, with references to the drawings, the embodiments of the present invention will be described in detail. FIG. 1 to FIG. 8 are figures showing one embodiment of a vehicle mounting structure for a battery pack according to the present invention.

Figure 1:
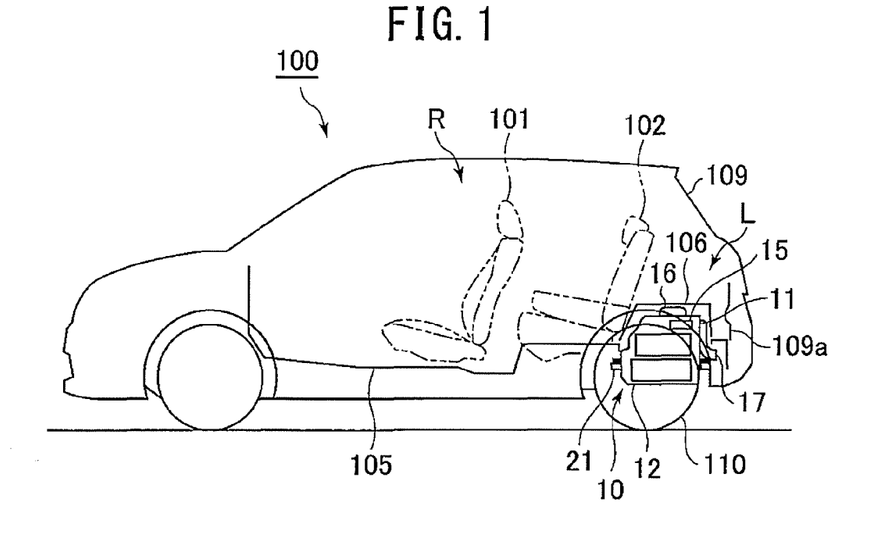
FIG. 1 is a figure showing one embodiment of a vehicle mounting structure for a battery pack according to the present invention, which is a see through side view showing a structure in a vehicle as a whole.
Figure 2:
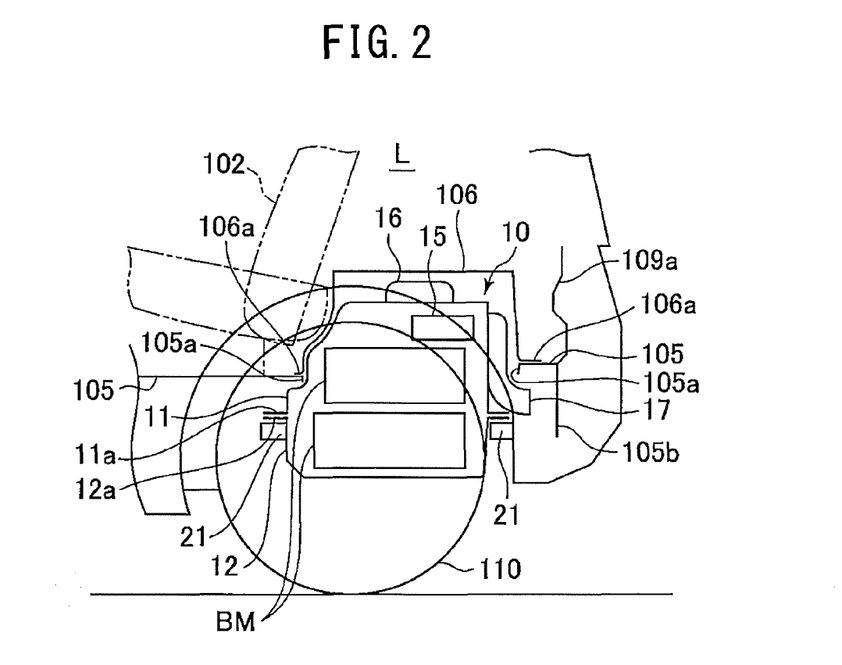
FIG. 2 is a partially enlarged see through side view of a vehicle mounting structure for a battery pack of FIG. 1.

In FIG. 1 and FIG. 2, a vehicle 100 has a floor panel 105 on which a front seat 101 and a rear seat 102 are installed, which constitutes a floor surface and forms a passenger room R, and a rear of this passenger room R is constructed to be utilizable as a luggage room L capable of being opened by opening and closing of a hatchback door 109. This vehicle 100 is constructed as a hybrid vehicle that mounts a large capacity battery pack 10 inside its luggage room L. Here, although omitted to be shown in the figures, the hybrid vehicle carries out the air conditioning processing and the like inside the passenger room R by supplying electric powers from the battery pack 10 to the electric parts such as an air conditioning device mounted on the vehicle, while realizing a driving at a desired speed by appropriately driving the electric motor along with the combustion engine by supplying electric powers from the battery pack 10 also to the electric motor that is to become a driving source. Note that, in the present embodiment, the hybrid vehicle will be described as one example, but it is not limited to this, and it goes without saying that it is applicable to the electric vehicle that drives with the driving force of the electric motor alone.

In the battery pack 10, a space for accommodating a plurality of battery modules (batteries) array BM in its interior is formed by abutting opening edge portions 11a and 12a of an upper casing 11 and a lower casing 12.

This battery pack 10 is installed such that a part of the upper casing 11 is positioned at an upper side than an installation level of the floor panel 105 in the luggage room L of the vehicle 100, and installed such that the lower casing 12 as a whole is positioned at a lower side than that installation level. Also, this battery pack 10 is attached with a cover panel 106 in such a way that it becomes continuous with the floor panel 105 of the luggage room L, and the upper casing 11 side is covered so as not to be exposed inside the luggage room L.

Figure 6:
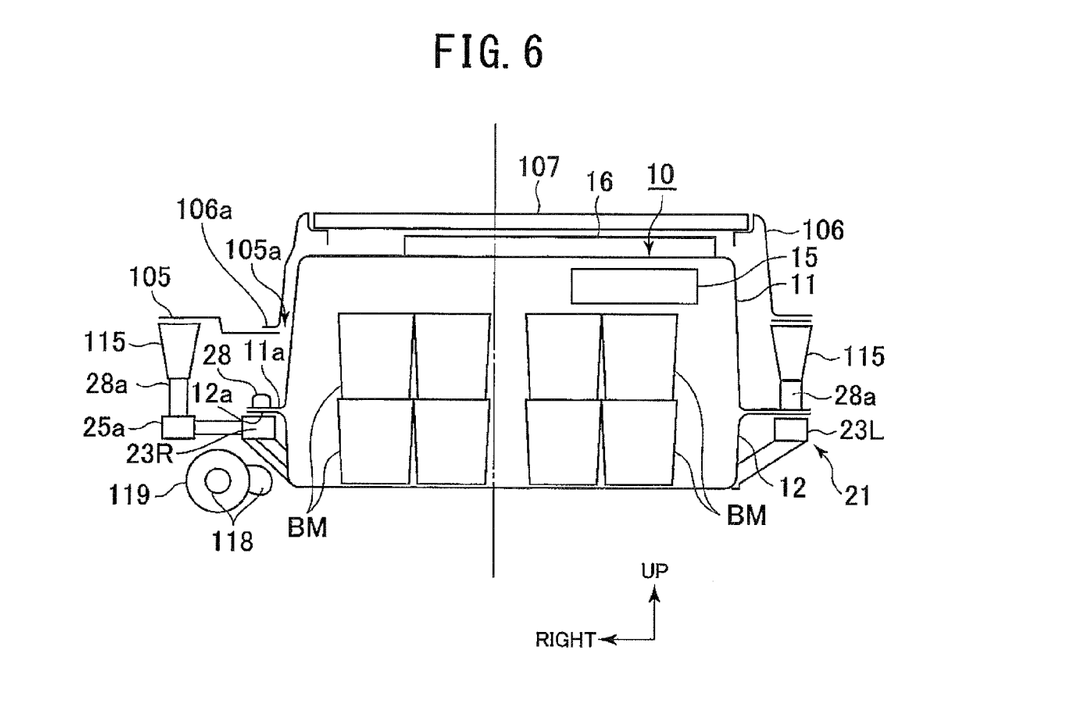
FIG. 6 is a partially enlarged see through front view in which a vicinity of the battery pack in a rear portion of the vehicle of FIG. 1 is viewed from a front side.

Note that this cover panel 106 is formed with almost an entire surface of its upper portion arranged as a lid and attached to be detachable, so that it is possible to carry out various types of maintenance operations such as that of an air cleaner 16 to be described below (see FIG. 3) by opening its entire surface by removing the service lid 107 (see FIG. 6).

Here, the battery module array BM has a plurality of battery modules arranged parallel in a horizontal direction, and this battery module array BM is designed to be capable of storing large capacity electric powers by being accommodated in a state of two stacks piled inside the battery pack 10.

The battery pack 10 secures a sufficient accommodation space while reducing an occupied area inside the luggage room L of the vehicle 100 as small as possible, by forming the accommodation space capable of piling two stacks of this battery module array BM inside the upper casing 11 and the lower casing 12.

Also, the battery pack 10 has a cooling fan 15 installed on an upper side of the upper stack battery module array BM, and that cooling fan 15 is made to cool down the heat generation at a time of input and output of electric currents by introducing outside air into its interior via the air cleaner 16 and ventilating it from a ventilation duct 17.

Also, this battery pack 10 is formed in a shape in which the accommodation space of the battery module array BM is divided into the upper casing 11 and the lower casing 12, and these upper casing 11 and lower casing 12 have the opening edge portions 11a and 12a that are formed in flange shapes to be abutted with each other. These upper casing 11 and lower casing 12 are made to occlude the accommodation space of their interior by abutting the opening edge portions 11a and 12a in a mutually facing form. Also, the upper casing 11 and the lower casing 12 are made to be attached and supported in a state incapable of falling off, by fixing the opening edge portions 11a and 12a in the flange shapes that protrude outwardly from an outer circumference, to a body side of the vehicle 100 in a state of being mounted on sub-frames 21 to be described below.

In this state, the battery pack 10 is installed on the vehicle 100 such that an upper side of the upper casing 11 is exposed from an opening 105a that is opened up on the floor panel 105 of the luggage room L, and this opening 105a of the floor panel 105 is closed by having an opening edge portion 106a in a flange shape of the cover panel 106 facing and fixed with its peripheral portion.

Here, as shown in FIG. 3 to FIG. 6, the vehicle 100 realizes the driving by attaching wheels 110 to both end portions of a suspension beam 111 that is provided at the rear seat 102 side of the luggage room L. The suspension beam 111 has arm portions 112 that are extending toward a rear of the vehicle, which are supported with their base end sides freely rotatable on a pair of left and right side members (framework members) 115 that are provided to be extending in a front and rear direction of the vehicle at both sides of the body side of the vehicle 100, and wheels 110 are supported to be freely rotatable at tip end sides of these arm portions 112.

Figure 3:
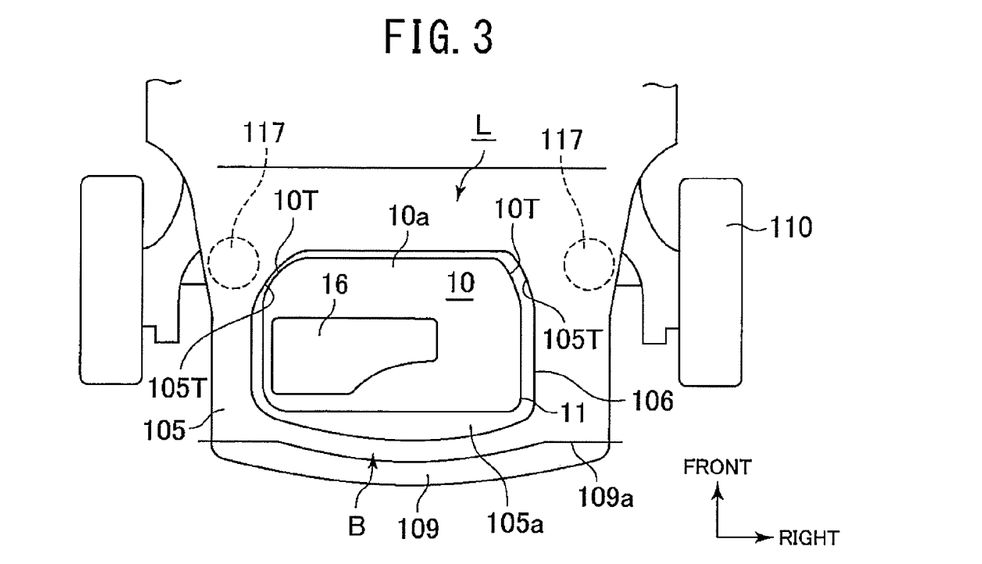
FIG. 3 is a plan view at a floor panel level in which a rear side of the vehicle of FIG. 1 is viewed from an upper side.
Figure 4:
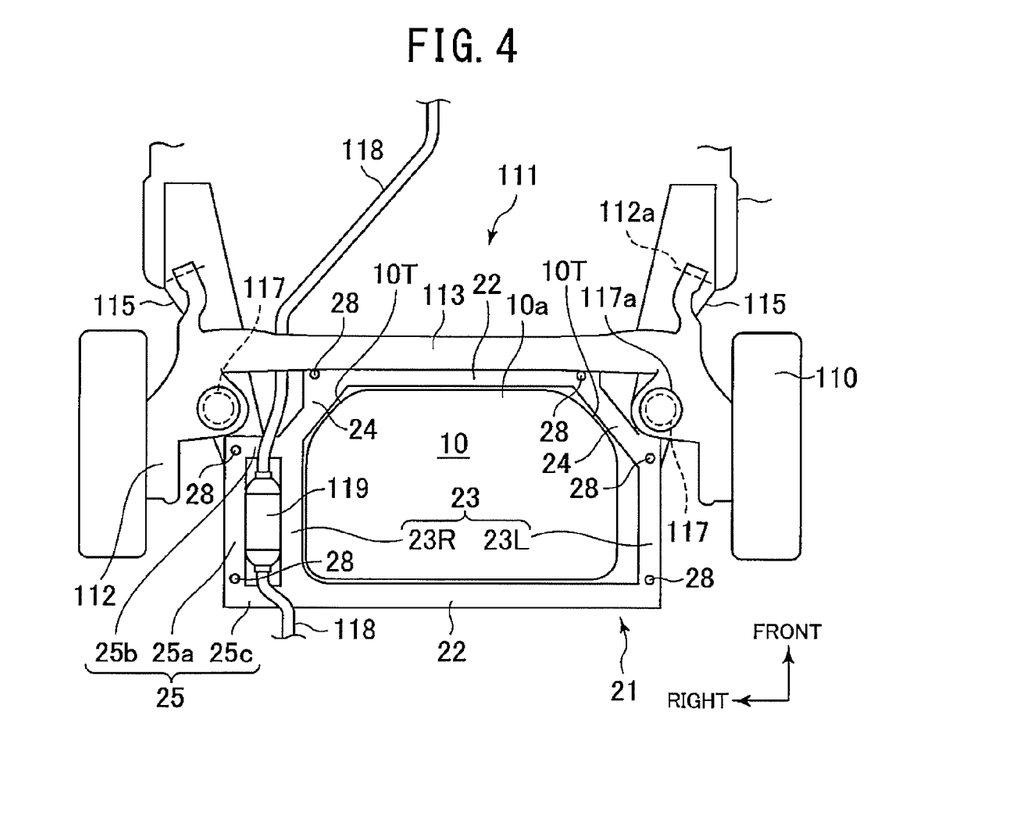
FIG. 4 is a plan view at a floor panel level in which a rear side of the vehicle of FIG. 1 is viewed from a lower side.
Figure 5:
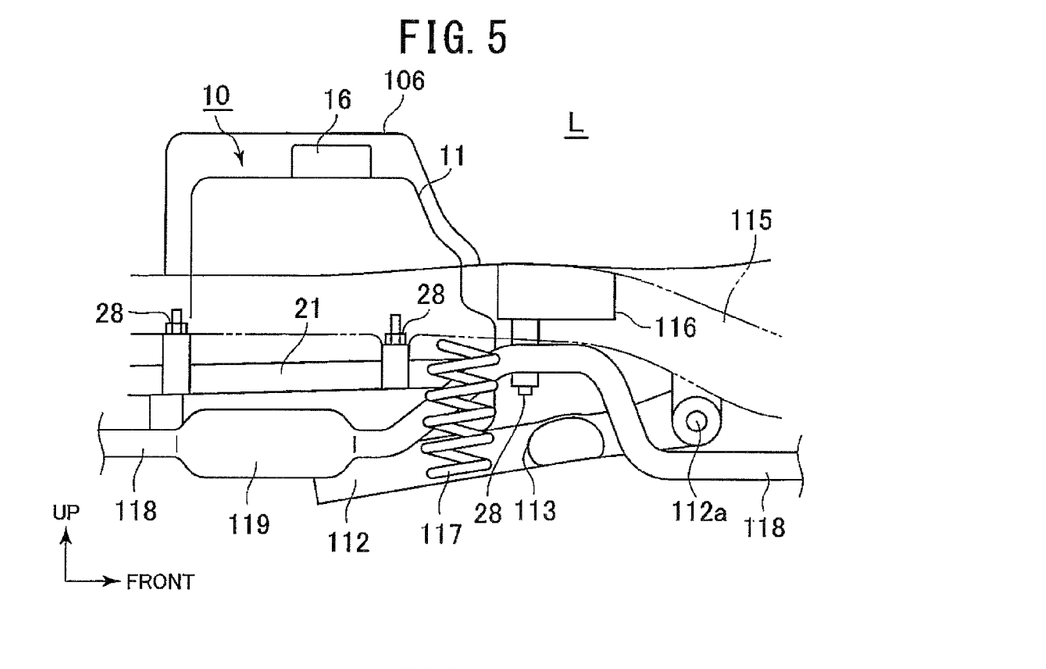
FIG. 5 is a partially enlarged see through side view in which a vicinity of the battery pack in a rear portion of the vehicle of FIG. 1 is viewed from a side.

In this suspension beam 111, a space between locations in close proximity to a pivotal point 112a of this arm portion 112 is linked by a beam portion 113 that extends in a width direction of the vehicle, and the coil springs 117 are intermediating between the arm portion 112 and the side member 115 at locations adjacent to that bean portion 113 so that the comfortableness of the vehicle 100 is improved. Note that, 117a in FIG. 4 is a receiving member of the coil spring 117, and its installation position is shown in the figure. Also, 109a in FIG. 3 is a border line indicating an internal surface position of the hatchback door 109 of a rear portion (it is the same in the other figures as well).

Also, this vehicle 100 has an exhaust pipe 118 for guiding rearward a high temperature exhaust gas from the combustion engine installed at a front portion of the vehicle and releasing it to the external, which is installed by being extended in the front and rear direction of the vehicle. The exhaust pipe 118 is extended by being formed in a bent shape so as to pass over the beam portion 113 of the suspension beam 111, and then linked to a muffler 119, and this exhaust pipe 118 is arranged to be positioned between the coil spring 117 and the battery pack 10 on a right side of the vehicle 100. In other words, the battery pack 10 (the opening portion 105a of the floor panel 105) is offset to a left side of the luggage room L so as to secure as large area and large capacity space as possible.

Then, the battery pack 10 is formed in a tapered shape without corner portions such that an outer surface shape inside an extended plane of the floor panel 105 becomes thinner (an outer surface interval becomes narrower) as a front portion 10a of a front surface side facing a front side of the vehicle enters deeper into a space between the pair of left and right coil springs 117. For this reason, the opening 105a of the floor panel 105 on the body side of the vehicle 100 is also similarly formed in a tapered shape such that the opening shape becomes thinner as it enters deeper into a space between the coil springs 117.

Namely, the battery pack 10 will be positioned such that a middle portion of the tapered outer surface 10T at the front portion 10a makes a facing distance with the coil spring 117 shortest. This tapered outer surface 10T is produced in a form facing and separated by a constant distance from the coil spring 117 by being formed in an inclined shape that is smoothly continuous with both a side face side and a front face side of the casing outer surface.

Figure 7:
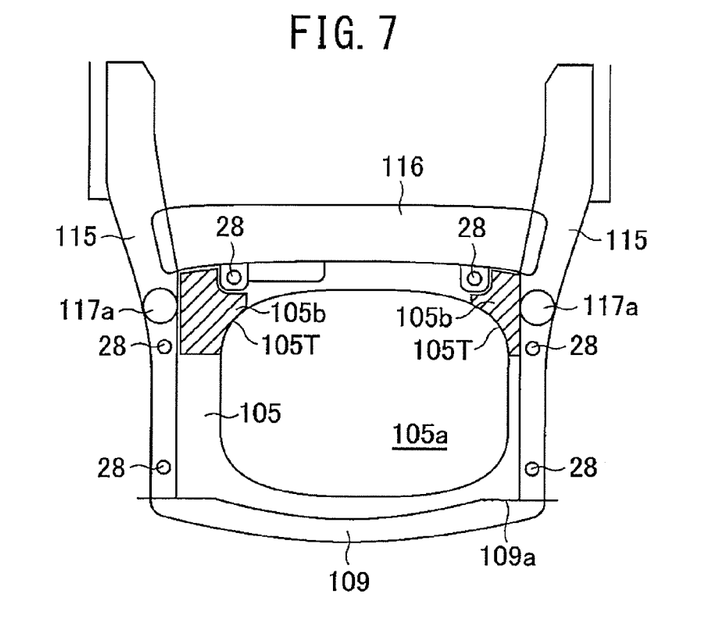
FIG. 7 is a bottom face view showing a structure of the floor panel in a rear portion of the vehicle of FIG. 1.

For this reason, as shown in FIG. 7, the floor panel 105 of the body side of the vehicle 100 has the facing regions 105b between the opening 105a and the coil springs 117 that are facing to the tapered outer surface 10T of the front portion 10a of that battery pack 10, and a tapered edge 105T along that tapered outer surface 10T is also formed on a front portion of that opening 105a. Thus, the tapered edge 105T at a front portion of the opening 105a of the floor panel 105 is also formed in an inclined shape that is smoothly continuous, similarly as the tapered outer surface 10T of a front portion of the battery pack 10, and its middle portion is formed in a form facing and separated from a constant shortest distance from the coil spring 117.

In this way, the battery pack 10 can be arranged to be nearer to a back side of the rear seat 102 inside the luggage room L, so that it is possible to secure a shock absorbing space B of a large capacity between the battery pack 10 and the hatchback door 109 (the exterior member), and improve the shock absorbing capability at a time of a crash from a rear side.

Also, the opening 105a of the floor panel 105 is offset to a left side of the luggage room L so as to avoid the exhaust pipe 118 and the muffler 119 while being formed into an inclined tapered edge 105T in correspondence to the tapered outer surface 10T of the front portion 10a of the battery pack 10, such that the facing regions 105b with the coil springs 117 can be made to have a wide width. For this reason, the floor panel 105 can be formed in a shape advantageous for suppressing vibrations by making the width of the facing regions 105b in close proximity (adjacent) to the coil springs 117 that are the origin of the propagation of vibrations to be large in a direction separating them from the coil springs 117.

Now, this battery pack 10 is made to be attached and fixed to the body side of the vehicle 100 by being fixed to sub-frames 21 to be attached to side members 115 and a cross member (framework member) 116 that is connected to these side members 115 by extending in the vehicle width direction of the body side of the vehicle 100.

The sub-frames 21 are formed in frame shapes that generally coincide with the opening edge portions 11a and 12a of the upper casing 11 and the lower casing 12 of the battery pack 10, and this sub-frame 21 is assembled into a frame shape by linking and fixing cross frames 22, side frames 23, slope frames 24 and an off frame 25 by the welding and the like.

The cross frames 22 are produced as a pair of front and rear members extending in the vehicle width direction by being separated in the vehicle front and rear direction, such that they face with a front portion side and a rear portion side of the opening edge portions 11a and 12a of the upper casing 11 and the lower casing 12 of the battery pack 10 (the opening 105a of the floor panel 105).

The side frames 23 are similarly produced as a pair of left and right members extending in the vehicle front and rear direction by being separated in the vehicle width direction, such that they face at both side portion sides of the battery pack 10. The left side frame 23L located at a vehicle left side is directly linked and fixed to a side member 115 by fasteners 28. On the other hand, a right side frame 23R located at a vehicle right side is linked and fixed to a side member 115 by fasteners 28 via the off frame 25, as the battery pack 10 is installed at an offset position that avoids the exhaust pipe 118 and the muffler 119.

The slope frames 24 are similarly produced as a pair of left and right members that are inclined at both sides of the front portion side, such that they face with the opening edge portions 11a and 12a outside the tapered outer surfaces 10T of the both sides that are inclined at the front portion 10a of the battery pack 10, and their both ends are linked and fixed to the side member 115 and the cross member 116 by the fasteners 28.

The off frame 25 comprises a parallel off frame 25a and linking off frames 25b and 25c. The parallel off frame 25a is adjacent to and parallel to the right side frame 23R (the battery pack 10) by being separated in a horizontal direction at positions sandwiching the exhaust pipe 118 and the muffler 119 between them, and that right side frame 23R has both end sides linked by the linking off frames 25b and 25c.

These sub-frames 21 are made to enclose the opening 105a of the floor panel 105, and be linked and fixed to the side members 115 and the cross member 116 from a lower side by the fasteners 28. In this way, the floor panel 105 is reinforced, and the vibrations of the floor panel 105 can be suppressed. Note that the sub-frames 21 are fastened and fixed to these members via rod shaped members 28a that function as spacers, at locations where they are distanced in the up and down direction from the side members 115 and the cross member 116.

In this way, the battery pack 10 can tightly fasten and fix the opening edge portions 11a and 12a of the upper casing 11 and the lower casing 12 by the fasteners 28, to the sub-frames 21 that have a sufficient strength by being fixed to the side members 115 and the cross member 116, and in particular they can be securely and tightly fastened and fixed to the slope members 24 even at outer sides of the tapered outer surfaces 10T (the corner portions).

Figure 8:
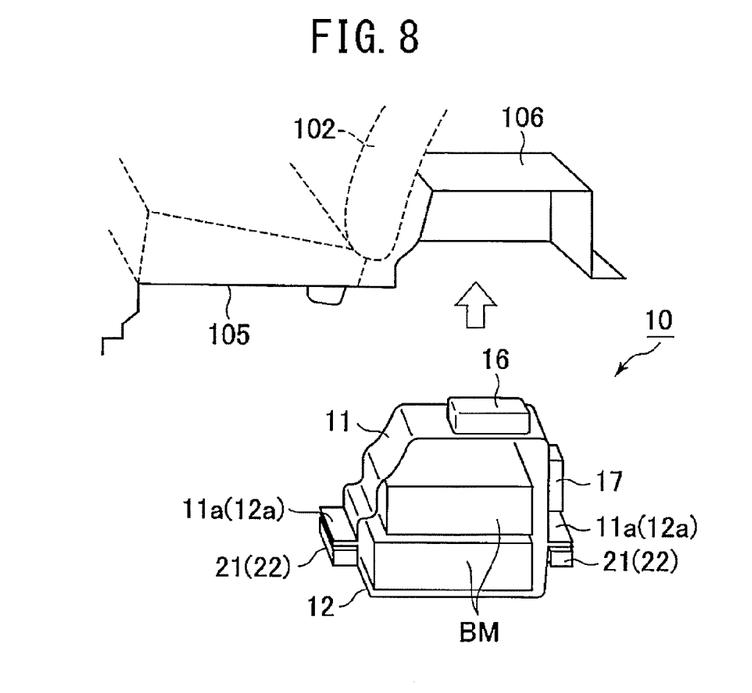
FIG. 8 is an exploded perspective view showing an installation of the battery pack to a rear portion of the vehicle of FIG. 1.

Also, as shown in FIG. 8, this battery pack 10 can support the opening edge portions 11a and 12a of the upper casing 11 and the lower casing 12 by mounting them on the sub-frames 21 assembled in frame shapes, while attaching them in a state of being located inside the cover panel 106 by entering them inside the opening 105a of the floor panel 105 toward an upper side from a lower side of the body of the vehicle 100. For this reason, the battery pack 10 can be easily attached to the side members 115 and the cross member 116 of the body side of the vehicle 100 along with the sub-frames 21.

As such, in the present embodiment, by adopting a structure in which the opening edge portions 11a and 12a in the flange shapes of the upper casing 11 and the lower casing 12 are facing each other, it is possible to secure the accommodation space of a large capacity capable of piling up the battery module array BM in stacks inside the battery pack 10.

This battery pack 10 can surely and firmly fasten and fix its opening edge portions 11a and 12a to the body side of the vehicle 100 easily in a manner of being sandwiched by the sub-frames 21, by entering them into the opening 105a of the floor panel 105 from a lower side.

Moreover, the battery pack 10 can secure a large shock absorbing space B at a rear portion of the vehicle 100, and improve the shock absorbing capability with respect to a crash from a rear side, by forming the front portion 10a into the tapered outer surface 10T. Also, at the floor panel 105 having the opening 105a inside of which this battery pack 10 is to be inserted, the facing regions 105b adjacent the coil springs 117 can be formed in a wide width, so that it is possible to suppress the floor panel 105 from vibrating largely as these portions are deformed. Therefore, at a time of adopting a layout in which the battery pack 10 is positioned between the coil springs 117 of the rear seat 102 side, it is possible to effectively suppress the so called chatter sounds due to vibrations from being generated.

As other forms of the present embodiment, although the present embodiment describes the case of adopting a layout in which the battery pack 10 is installed inside the luggage room L at a rear portion of the vehicle 100 as one example, it is not limited to this, and it can be suitably applied even to the case where the luggage room is arranged on a front side of the vehicle and the battery pack is installed therein. Also, it goes without saying that, in addition to making the front portion side of the battery pack in the tapered shape, the rear portion side may be formed in a tapered shape, depending on the positional relationship with the coil springs.

Also, in the present embodiment, the case of attaching and supporting the battery pack 10 to the sub-frames 21 by the side members 115 and the like is described as one example, but it can be applied suitably even in the case of adopting a structure in which the battery pack itself is directly fastened and fixed by screws.

The scope of the present invention will not be limited to the exemplary embodiments shown in the figures and described, and also includes all the embodiments that can bring about the effects equivalent to those at which the present invention is aimed. Moreover, the scope of the present invention will not be limited to combinations of the features of the invention specified by each claim, and can be specified by any desired combinations of the particular features among all of the disclosed respective features.

Although one embodiment of the present invention has been described up to here, the present invention is not limited to the above described embodiment, and it goes without saying that it may be practiced in various different forms within a range of its technical ideas.

The invention claimed is:

1. A vehicle having a mounting structure which holds a battery pack in which batteries are vertically stacked, wherein said vehicle comprises:
    a left side member and a right side member, extending along a front-to-rear direction of the vehicle and positioned on opposite sides of said battery pack, and wherein the left side member and the right side member are spaced in a left-to-right direction of the vehicle;
    a floor panel supported by said left side member and said right side member, said floor panel at least partially defining an opening;
    a suspension having arm portions supported to be rotatable at lower portions of said left side member and said right side member, and
    a left coil spring and a right coil spring respectively arranged between said left and right side members and said arm portions,
    wherein said battery pack is installed inside said opening of said floor panel, and a front portion, with respect to the front-to-rear direction of said vehicle, of said battery pack is located between said coil springs, and
    said opening having a width dimension extending in the left-to-right direction of the vehicle, and said battery pack having a width dimension extending in the left-to-right direction of the vehicle, wherein the opening and the battery pack are configured to have a tapered shape such that, in a plan view of said vehicle, the width dimension of the battery pack and the width dimension of the opening decrease toward a front side of the vehicle, and wherein the tapered portion of the opening and the tapered portion of the battery pack are located in a vicinity of rear portions of the coil springs, and wherein said battery pack includes a lower portion at a lower side of said floor panel and an upper portion at an upper side of said floor panel, wherein the battery pack is configured such that, in a side view of said vehicle, a front end of said lower portion of the battery pack is located closer toward a front side of the vehicle than a front end of said upper portion of the battery pack.

2. The vehicle as recited in claim 1, further comprising a cover panel for covering said opening of said floor panel and attached on an upper surface of said floor panel, wherein said opening of said floor panel is arranged at an offset position near one side of the vehicle in the left-to-right direction of said vehicle, and wherein an opening edge of said opening is sandwiched between an upper end portion of one of said left and right side members and an outer edge portion of said cover panel.

3. The vehicle as recited in claim 2, wherein the battery pack includes an upper casing and a lower casing both located under the cover panel, and wherein a first portion of the upper casing is located under a seat of the vehicle and a second portion of the upper casing is located behind the seat.

4. The vehicle as recited in claim 3, wherein a length of the lower casing, along the front-to-rear direction of the vehicle, is greater than a length of the second portion of the upper casing, along the front-to-rear direction of the vehicle.

5. The vehicle as recited in claim 2, wherein the battery pack includes a casing positioned under said cover panel, and wherein said casing includes at least one edge portion fastened to at least one sub-frame member, and wherein the at least one sub-frame member is attached to one of said left and right side members.

* * * * *